(12) United States Patent
Greene et al.

(10) Patent No.: US 6,275,321 B1
(45) Date of Patent: Aug. 14, 2001

(54) POLARIZATION-INSENSITIVE OPTICAL MODULATORS

(75) Inventors: Peter David Greene, Harlow; Mark Silver; Alfred Rodney Adams, both of Guildford, all of (GB)

(73) Assignee: Nortel Networks Limited, Montreal (CA)

( * ) Notice: Subject to any disclaimer, the term of this patent is extended or adjusted under 35 U.S.C. 154(b) by 934 days.

(21) Appl. No.: 08/510,752

(22) Filed: Aug. 3, 1995

(30) Foreign Application Priority Data

Aug. 3, 1994 (GB) .................................................. 9415643

(51) Int. Cl.[7] .......................... G02F 1/03; H01L 31/0328
(52) U.S. Cl. ........................... 359/248; 359/250; 257/18; 257/21; 257/184; 257/189; 257/190; 257/191
(58) Field of Search ..................................... 359/248, 250, 359/321; 257/189–191, 18, 21, 184

(56) References Cited

U.S. PATENT DOCUMENTS 5,090,790   2/1992   Zucker .................................. 385/130
5,153,687 * 10/1992   Ishikawa ................................ 357/30

FOREIGN PATENT DOCUMENTS

0416879A1 * 3/1991 (EP) .

OTHER PUBLICATIONS

Chen, "Quantum–confined Stark shift for differently shaped quantum wells", Semiconductor Sci. Technol., vol. 7, 1992, pp. 828–836.

Stavrinou, "Use of a three–layer quantum–well structure to achieve an absorption edge blueshift", Applied Physics Letters, vol. 64, No. 10, Mar. 7, 1994, pp. 1251–1253.

Aizawa, "Polarization–Independent Quantum–Confined Stark Effect in an InGaAs/InP Tensile–Strained Quantum Well", IEEE Journal of Quantum Electronics, vol. 30, No. 2, Feb. 2, 1994, pp. 585–592.

Zhou, "Simultaneous blue– and red–shift of light–hole and heavy–hole band in a novel variable–strain quantum well heterostructure", Applied Physics Letters, vol. 66, No. 5, Jan. 30, 1995, pp. 607–609.

Tutken, "Large observed exciton shifts with electric field in InGaAs/InGaAsP stepped quantum wells", Applied Physics Letters, vol. 63, No. 8, Aug. 23, 1993, pp. 1086–1088.

* cited by examiner

*Primary Examiner*—Evelyn A Lester
(74) *Attorney, Agent, or Firm*—Lee, Mann, Smith, McWilliams, Sweeney and Ohlson (57) ABSTRACT

The or each strained quantum well layer of a quantum confined Stark effect modulator is provided with a substructure of substructure layers not all having the same lattice constant. The thickness and composition of these substructure layers may be arranged to produce a differential strain that is asymmetric with respect to the mid-plane of the quantum well and so skews the hole wavefunctions for heavy-holes, HH1, and light-holes, LH1, in opposite directions. This enables the choice of composition designed to provide substantial matching of the E1-HH1 and E1-LH1 Stark shifts for one particular polarity of applied field, thereby providing a modulation facility that is substantially polarisation insensitive. Alternatively, the thickness and composition of the layers may be chosen to produce a symmetrical strain profile in which the same effect is provided, but for both polarities of applied field.

7 Claims, 7 Drawing Sheets

POLARIZATION-INSENSITIVE OPTICAL MODULATORS

BACKGROUND TO THE INVENTION

Since it became clear that the wavelength chirp present with direct modulation of a laser source would severely limit the possible modulation band-widths available for long-wavelength (around 1.5 μm) optical communication, there has been great interest in developing high-speed electroabsorption and electroreflectance modulators. This has led to the design of a number of modulator and integrated laser-plus-modulator structures based on the quantum confined Stark effect (QCSE). The quantum well layers of such quantum well semiconductor structures are typically single composition layers possessing no substructure, and hence providing wells that are substantially flat-bottomed and square-sided. There has, however, also been some investigation of the properties of quantum well layers that do possess a substructure, such a substructure being provided to produce a more complicated well profile. Thus EP 0 416 879 proposes a QCSE modulator whose quantum well layers have a substructure comprising two substructure layers of different material designed to provide the well with a built-in step that produces a dipole at zero applied electric field, and in consequence is designed to produce applied field induced band edge shifts without any significant change in absorption coefficient. A somewhat similar structure is described by T. Tütken et al in a paper entitled, "Large observed exciton shifts with electric field in InGaAs/InGaAsP stepped quantum wells", App. Phys. Lett. 63 (8), Aug. 22, 1993, pp 1086–1091, whose authors are concerned to maximise the QCSE shift for a given value of applied field. The effects upon various parameters, including Stark shift, exciton binding energy, and overlap of electron and hole wavefunctions, produced by changing the shape of quantum wells, have been made the subject of study in a paper by W. Chen & T. G. Anderson entitled "Quantum-confined Stark shift for differently shaped quantum wells", Semicond. Sci. Technical 7 (1992) pp 823–836. This paper treats not only substructures providing 2-step and 3-step wells, but also wells with profiles that are partly or wholly continuously graded. A quantum well substructure can also be employed to provide a QCSE device that exhibits a blue-shift of absorption edge instead of the red-shift exhibited by QCSE devices of more conventional type. Such a blue-shift device is described by P. N. Stavrinou et al in a paper entitled, "Use of a three-layer quantum-well structure to achieve absorption edge blueshift", App. Phys. Lett. 64 (10), Mar. 7, 1994, pp 1251–1253. Blue-shift resulting from a non-uniform composition quantum well is also described by W. Zhou et. al. in a paper entitled, "Simultaneous blue- and red-shift of light-hole and heavy-hole band in a novel variable-strain-quantum well heterostructure", App. Phys. Lett. 66 (5) Jan. 30, 1995 pp 607–609. This describes a strained quantum well with a graded composition providing a value of strain that is graded in magnitude from one side of the well to the other. The paper explains that this grading makes the device polarisation controllable, providing it with the property that, at a unique value of applied bias, there is a cross-over between the red- and blue- Stark shifts for the heavy- and light-hole transitions.

In an integrated laser-plus-modulator the state of polarisation of the laser light that is incident upon the modulator is fully determined, and this may also be conveniently arranged to be the situation in the case of laser-plus-modulator configurations that are not integrated. Under these circumstances matters can usually be arranged so that any polarisation sensitivity exhibited by the modulator is of no practical consequence. On the other hand, there are other applications of modulator structures, such as pulse train shaping, where the polarisation of the light beam is unknown. There have therefore been attempts to design polarisation-insensitive quantum confined Stark effect (QCSE) modulators for these 'between fiber' applications. In the long wavelength range (around 1.5 μm), studies have been made of InP-based devices containing InGaAs layers with a modest amount of tensile strain (less than 1% lattice mis-match). With the appropriate strain for the well thickness, the E1-HH1 transition (which is responsible for most of the TE absorption) and E1-LH1 transition (which is responsible for TM absorption) can be made degenerate at zero bias. This has been shown in the paper by T. Aizawa, K. G. Ravikumar, S. Suzaki, T. Watanabe, and R. Yamauchi, "Polarisation-independent quantum confined Stark effect in an InGaAs/InP tensile-strained quantum well", IEEE Journal of Quantum Electronics, 1994, 30, pp. 585–593, to correspond to equal TE and TM absorption of the incident light beam at zero bias, and hence to polarisation-insensitivity. However, as a field is applied across these structures the E1-LH1 and E1-HH1 transitions show different Stark shifts and do not remain matched because the shifts depend on the effective masses. As a result, existing modulator structures based on the QCSE are only truly polarisation insensitive at one field strength.

SUMMARY OF THE INVENTION

The present invention is directed to the design of a QCSE-based modulator which is substantially polarisation insensitive over a range of field strengths.

According to the present invention there is provided a quantum confined Stark effect modulator in which the or each quantum well layer of the modulator has a non-uniform composition that provides, across the thickness of the layer, a non-uniform value of lattice constant to produce a strain profile in the modulator that provides the modulator with substantially matching E1-HH1 and E1-LH1 Stark shifts for at least one polarity of applied electric field from 0 up to 100 kV/cm.

BRIEF DESCRIPTION OF THE DRAWINGS

There follows a description of QCSE-based modulators embodying the present invention in preferred forms. The description refers to the accompanying drawings in which.

DETAILED DESCRIPTION OF PREFERRED EMBODIMENTS

Figure 1:
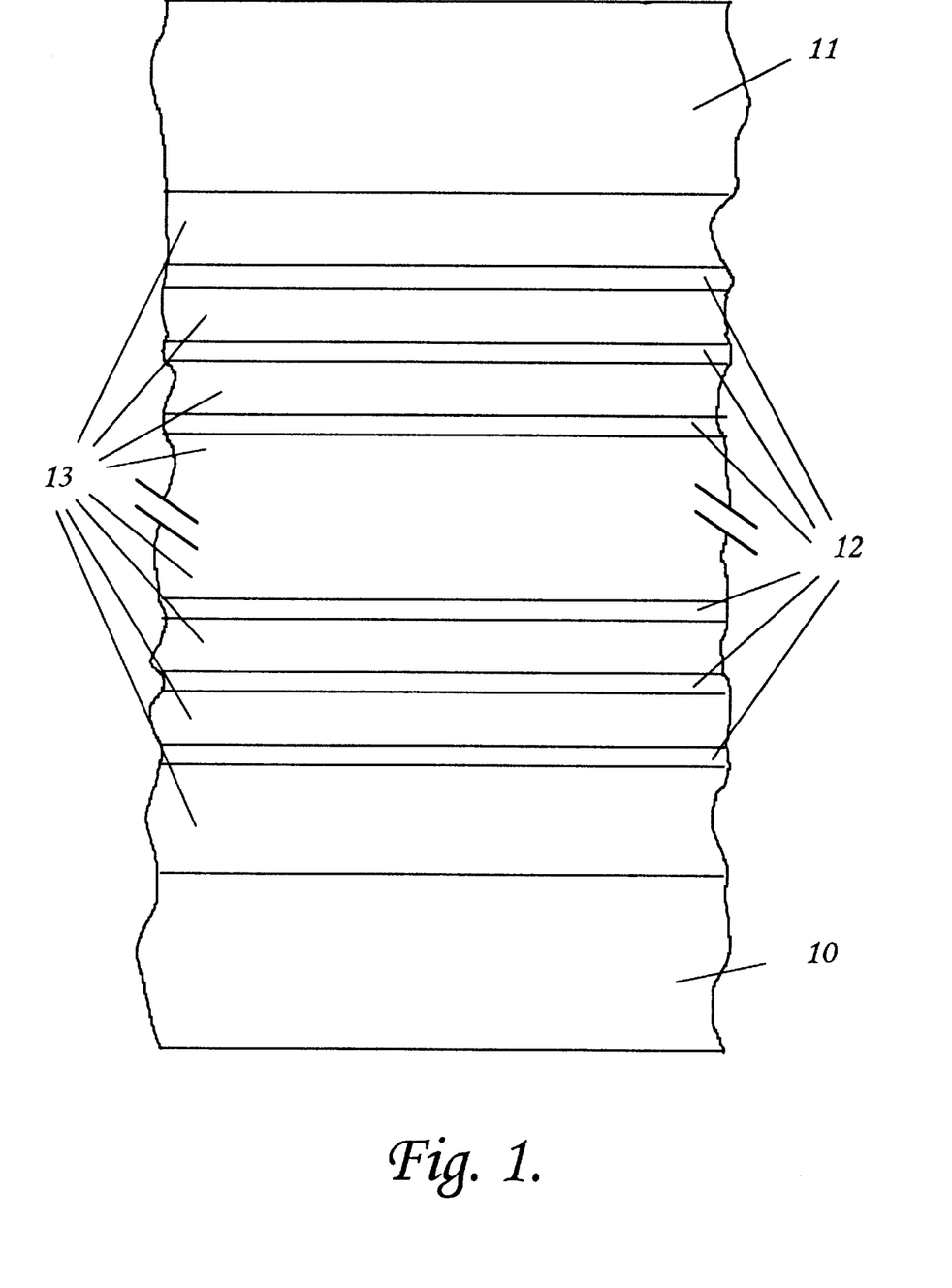
FIG. 1 is a diagrammatic representation of a reverse biased p-i-n multiquantum well Stark effect modulator.

FIG. 1 is a diagrammatic representation of a multi-quantum well (MQW) structure that consists of a p-i-n structure having an n-type substrate 10 upon which is epitaxially grown in succession an i-type region and then a p-type region 11. The i-type region comprises a set of quantum wells 12 interlaced between a set of barrier layers 13 that are lattice matched with the n-type substrate 10 and p-type region 11. In a conventional MQW structure each quantum well is of uniform composition, but in this instance, in accordance with a teaching of the present invention, it possesses a substructure comprising two substructure layers of different composition. These substructure layers are separately identified at 12a and 12b in the band-structure diagram of FIG. 2, which also characterises the two substructure layers as being of equal thickness. (The invention is however also applicable to structures that are more complicated to analyse through having substructure layers of different thickness and/or having more than two substructure layers to a quantum well, and an example having these substructure layers to a quantum well will be described below).

Figure 3:
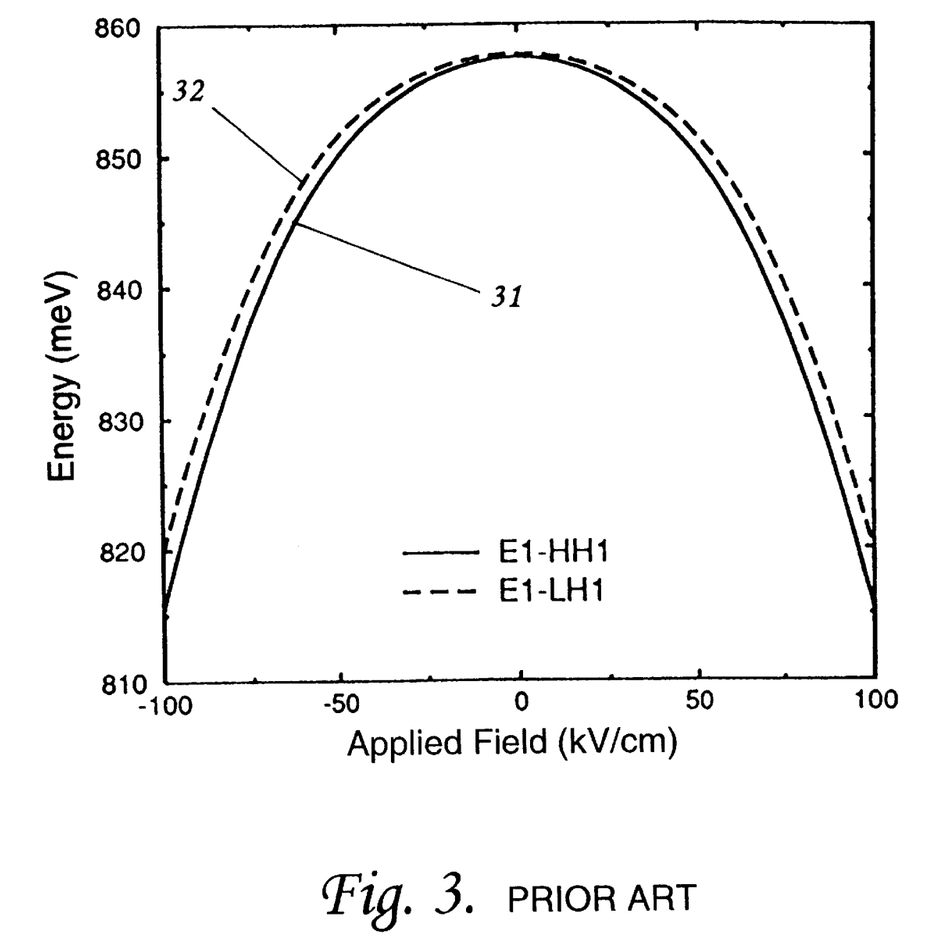
FIG. 3 is a plot of the Stark effect shifts for heavy-holes and light-holes in respect of a modulator without any quantum well layer substructure.

In the case of a simple basic quantum well structure comprising a single quantum well layer sandwiched between two barrier layers, the two barrier layers being of one composition and band gap while the quantum well layer is of a different composition and band gap, there is, in the absence of any quantum well substructure, a symmetry of structure which provides, in the direction normal to the plane of the quantum well layer, hole wavefunctions which are symmetric with respect to the mid-plane of that quantum well layer. These, in their turn, provide Stark shifts of the E1-HH1 and E1-LH1 transitions which are symmetrical with respect to polarity of net field strength. The presence of the quantum well layer removes the degeneracy between the energy levels of heavy-holes and light-holes but, by growing the quantum well layer with a composition that, in the absence of strain, is not lattice matched with that of the barrier layers, it is possible to impart a tensile strain to the quantum layer of a suitable magnitude in relation to the quantum well layer thickness such as to balance out this effect at zero net field. Stark shifts are then as depicted in FIG. 3. As stated previously, due to the different effective masses of heavy-holes, and light-holes, the HH1 heavy-hole characteristic 31 is precisely superimposed on the LH1 light-hole characteristic 32 only at the zero field point, and hence these Stark shifts are different for any non-zero value of field.

Figure 2:
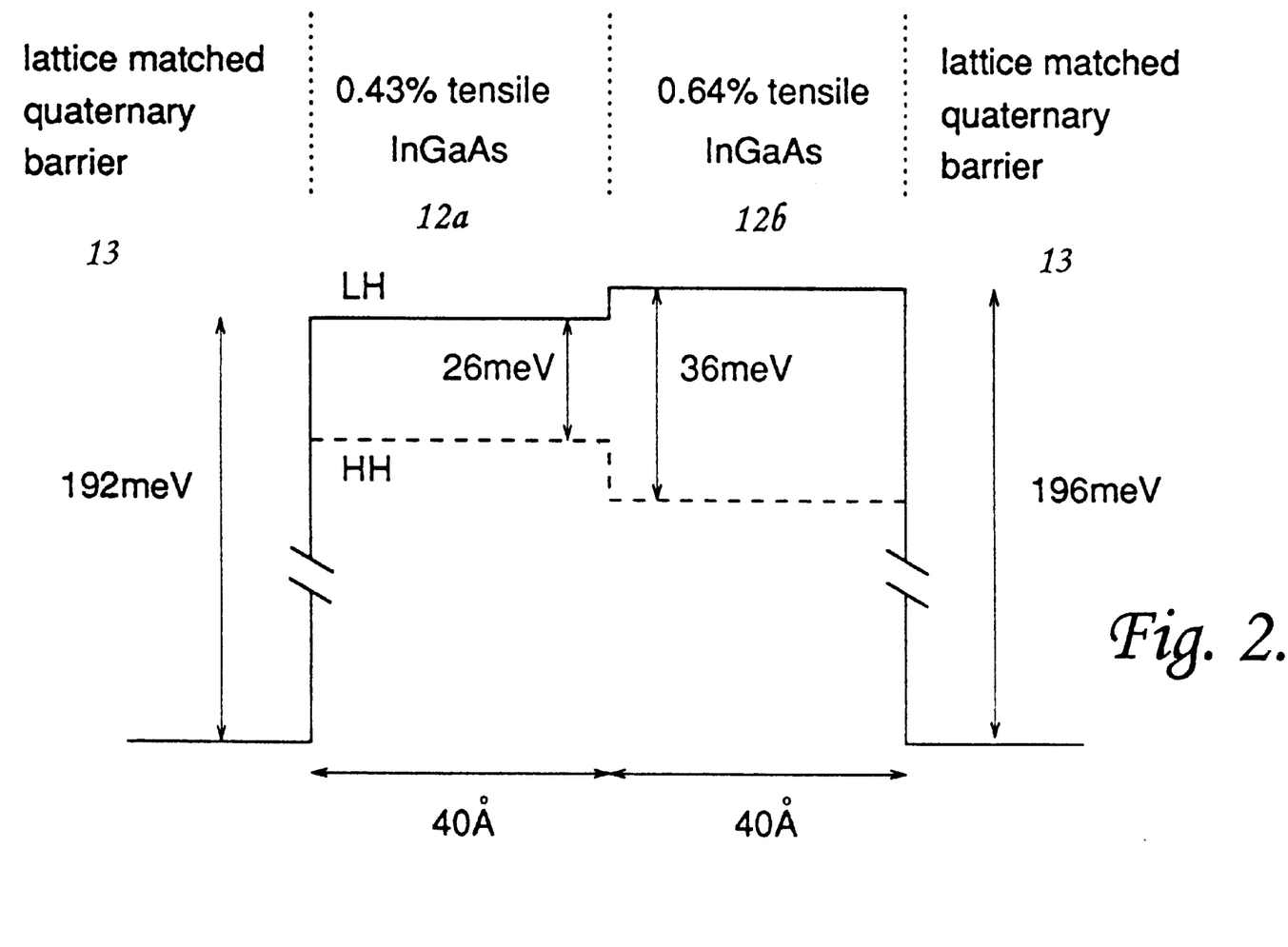
FIG. 2 is a band diagram of a quantum well of the modulator of FIG. 1 in which the quantum well layer has a substructure comprised of two equal thickness substructure layers of different material having different values of unstrained lattice constant.
Figure 4:
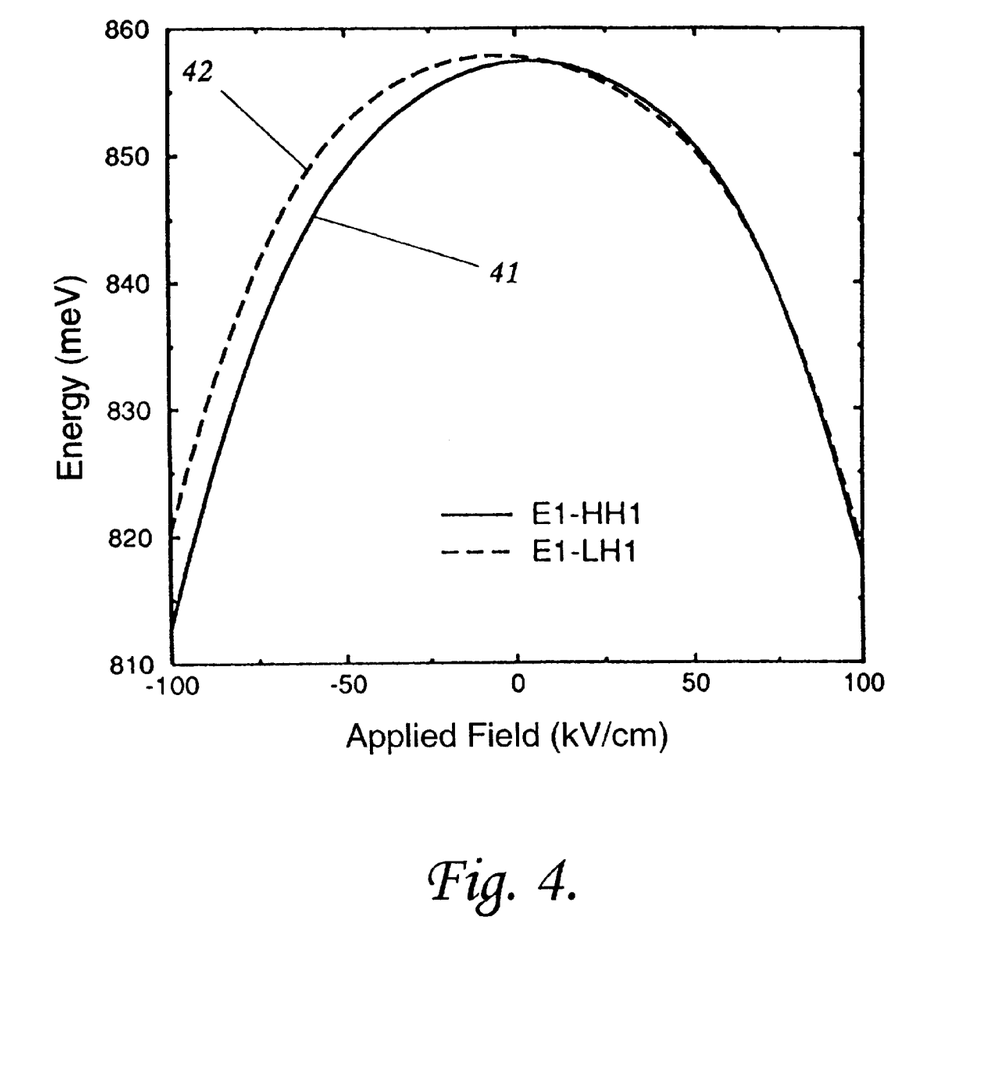
FIG. 4 is a plot of the Stark effect shifts for heavy-holes and light-holes in respect of a modulator with a quantum well 2-layer substructure providing the band diagram of FIG. 2.

Reverting attention once more to the quantum well structure to which FIG. 2 relates (i.e. a structure in which the quantum well does have a substructure comprising substructure layers 12a and 12b), the different strain values in the two substructure layers resulting from the use of different materials possessing different lattice constants in the absence of strain, introduce an asymmetry into the hole wavefunctions skewing the heavy-hole wavefunction somewhat to the left of the page in FIG. 2 and the light-hole wavefunction somewhat to the right. These, in their turn, provide Stark shifts of the E1-HH1 and E1-LH1 transitions that are offset in opposite directions with respect to the zero applied field point. By suitable choice of materials having regard to the thickness of the substructure layers, matters can be arranged so that there is substantial matching of the two Stark shifts for applied fields of one particular polarity, typically over a range from 0 up to 100 kV/cm or greater. Depending upon the particular use to which such a modulator may be put, it may be desirable to have the match extending substantially to breakdown field strength (which may be in the region of 300 kV/cm in the most favourable undoped regions), or it may be desirable to achieve a closer match over a more restricted range, for instance extending up only as far as 100 kV/cm. By way of specific example such a match is depicted in FIG. 4 which shows the computed Stark shifts in respect of a structure as depicted in FIG. 2 in which the barrier layers are made of InGaAsP (lattice matched with InP: $\lambda g=1.18$ μm) and in which the substructure layers 12a and 12b are both 40 Å thick of $In_{1-x}Ga_xAs$ in which the values of x are chosen respectively to provide tensile strain of 0.43% and 0.64%. In FIG. 4 in which the heavy-hole and light-hole characteristics are respectively given by curves 41 and 42, and in which a field applied by making the barrier layer adjacent substructure layer 12a positive with respect to the barrier layer adjacent substructure layer 12b has been arbitrarily designated a positive field. The degree of residual mismatch between the two Stark shifts for positive fields is computed as less than 1 meV over the range from 0 to 100 kV/cm. This compares with a separation of 6 meV at a field of 100 kV/cm in respect of the Stark effect fields of FIG. 3 in respect of quantum well possessing no substructure but strained to provide degeneracy at zero field strength.

The computation of the Stark shifts used the material parameters set out in tabular form (standard notation used throughout with quantum well strain and band-offsets calculated as M.C.P.N. Krijn, "Heterostructure band-offsets and effective masses in III-V quaternary alloys" Semicond. Sci. Technol., 1991, 6, pp 27–32, as follows:

| Material Parameter (unit) | $(In_{1-x}Ga_xAs)$ | $In_{0.79}Ga_{0.21}As_{0.45}P_{0.55}$ |
|---|---|---|
| $E_g$ (eV) | 0.36(1 − x) + 1.42x − 0.37x(1 − x) | 1.050 |
| $\Delta_0$ (eV) | 0.38(1 − x) + 0.34x − 0.0289x(1 − x) | 0.354 |
| a (Å) | 6.058(1 − x) + 5.653x | 5.869 |
| b (eV) | −1.53(1 − x) − 1.44x | — |
| $m_c$ ($m_0$) | 0.0185(1 − x) + 0.0665x | 0.0409 |
| $m_{hh}$ ($m_0$) | 0.41(1 − x) + 0.47x | 0.36 |
| $m_{lh}$ ($m_0$) | 0.0255(1 − x) + 0.08x | 0.051 |
| $E_{v,av}$ (eV) | −6.68(1 − x) − 6.84x | −6.884 |
| $a_v$ (eV) | 1.0(1 − x) + 1.16x | — |
| $a_c$ (eV) | −5.88(1 − x) − 8.06x | — | where
    Eg is the band gap energy
    $\Delta_0$ is the spin orbit splitting energy
    a is the lattice constant
    b is the axial shear deformation potential
    $m_c$ is the effective mass of an electron in the conduction band $m_0$ is the mass of an electron in free space $m_{hh}$ is the effective mass of a heavy-hole $m_{lh}$ is the effective mass of a light-hole $E_{v,av}$ is the valence band average energy $a_v$ is the valence band hydrostatic deformation potential and $a_c$ is the conduction band hydrostatic deformation potential The model used in the computation of modulator performance is based on a 5-point difference technique (following W. F. Aces, "Numerical methods for partial differential equations", Second Edition, Academic Press, New York, (1977), and J. P. Loehr and J. Singh, "Nonvariational numerical calculations of excitonic properties in quantum wells in the presence of strain, electric fields, and free carriers", Phys. Rev., 1990 B 42, pp.7154–7162.) with the valence band structure generated within the effective mass formalism using a 3-band (heavy-hole, light-hole, spin-split-off bands) k.p Hamiltonian including the effects of strain. The finite difference calculation allows the modelling of a quantum well containing any arbitrary combination of materials and strains, as well as the effects of applying a field across the structure.

It has already been stated that the present invention applies not only to modulators with 2-layer substructure quantum wells, but also to modulators with more complicated forms of substructure including modulators with 3-layer substructure quantum wells. One of the features of a 3-layer substructure is that it can be made symmetrical with respect to the mid-plane of the quantum well. In the case of the modulator structure described above with particular reference to FIG. 2, the presence of the lesser-strained material of layer 12a to the left of the more greatly strained material of layer 12b to the right has the effect of skewing the light-hole wavefunction to the left, and the heavy-hole wavefunction to the right, so that their right-hand sides are approximately coincident. It will be evident that, if the ordering of the two substructure layers 12a and 12b were reversed, the directions of the skewings could also be reversed, thereby giving rise to approximate coincidence of the left-hand sides of the two wavefunctions in stead of their right-hand sides. Accordingly, with a symmetrical arrangement of a 3-layer substructure, it is possible to arrange matters to have both types of skewing present at the same time in order to provide simultaneous approximate coincidence of both left- and right-hand sides of the wavefunctions. The operation of this symmetrical substructure may be alternatively viewed as providing the requisite matching as the result of the substructure serving to confine the heavy-hole wavefunction more tightly around the mid-plane of the quantum well layer than the light-hole wavefunction.

An example of such a symmetric arrangement will now be described with particular reference to FIGS. 5, 6, 7 & 8. In this instance matching is obtained using a symmetric 3-layer substructure arrangement.

Figure 5:
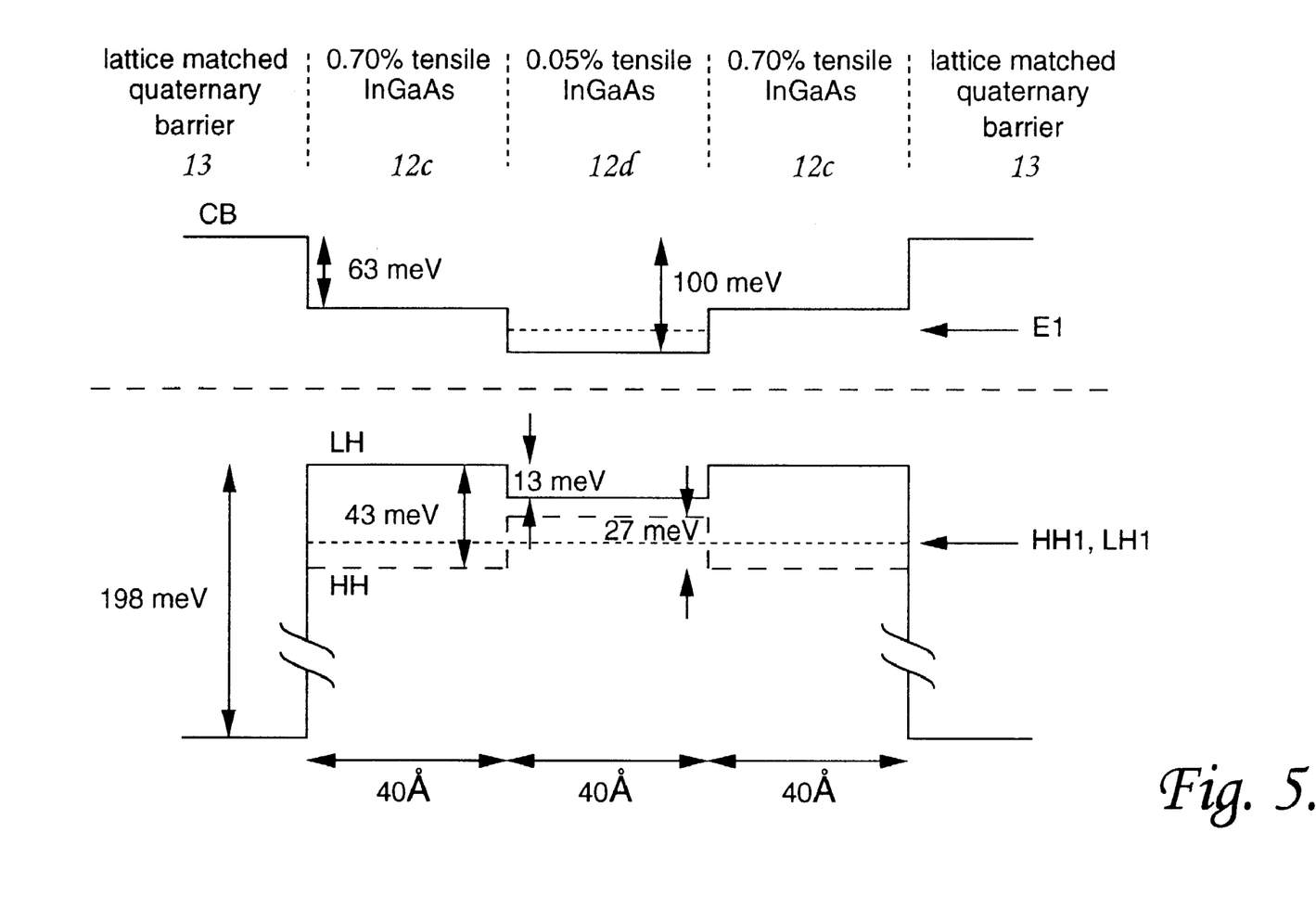
FIG. 5 is a band diagram of a quantum well an alternative form of the modulator of FIG. 1 in which the quantum well layer has a substructure comprised of three equal thickness layers the outer two of which have the same composition and lattice constant, which parameters are different from the corresponding parameters of the middle layer which lies between them.

The basic p-i-n structure of this laser is the same as that of the previously described modulator, and hence is as described above with reference to FIG. 1. The differences between this modulator and the earlier described modulator lie in the substructure of the quantum well layers. The quantum well layers of this modulator have a 3-layer substructure as illustrated in FIG. 5 comprising a two 40 Å thick InGaAs substructure layers 12c whose composition has been chosen to provide a lattice constant placing these substructure layers in 0.70% tensile strain. Sandwiched between these two substructure layers 12c is a single 40 Å thick InGaAs substructure layer whose composition has been chosen to provide a lattice constant placing this substructure layer in 0.05% tensile strain. (The compositions of substructure layers 12c and 12d are respectively $In_{0.52}Ga_{0.48}As$ and $In_{0.43}Ga_{0.57}As$). In the band structure diagram of FIG. 5 are shown the position of the confined energy levels of the electron and hole states. From these it will be evident that the HH1 state wavefunction in the multi-strain-stepped well will be mainly confined to the central 40Å region due to the heavy-hole potential profile, while the LH1 state wavefunction will be spread over the entire 120 Å well width.

Figure 6:
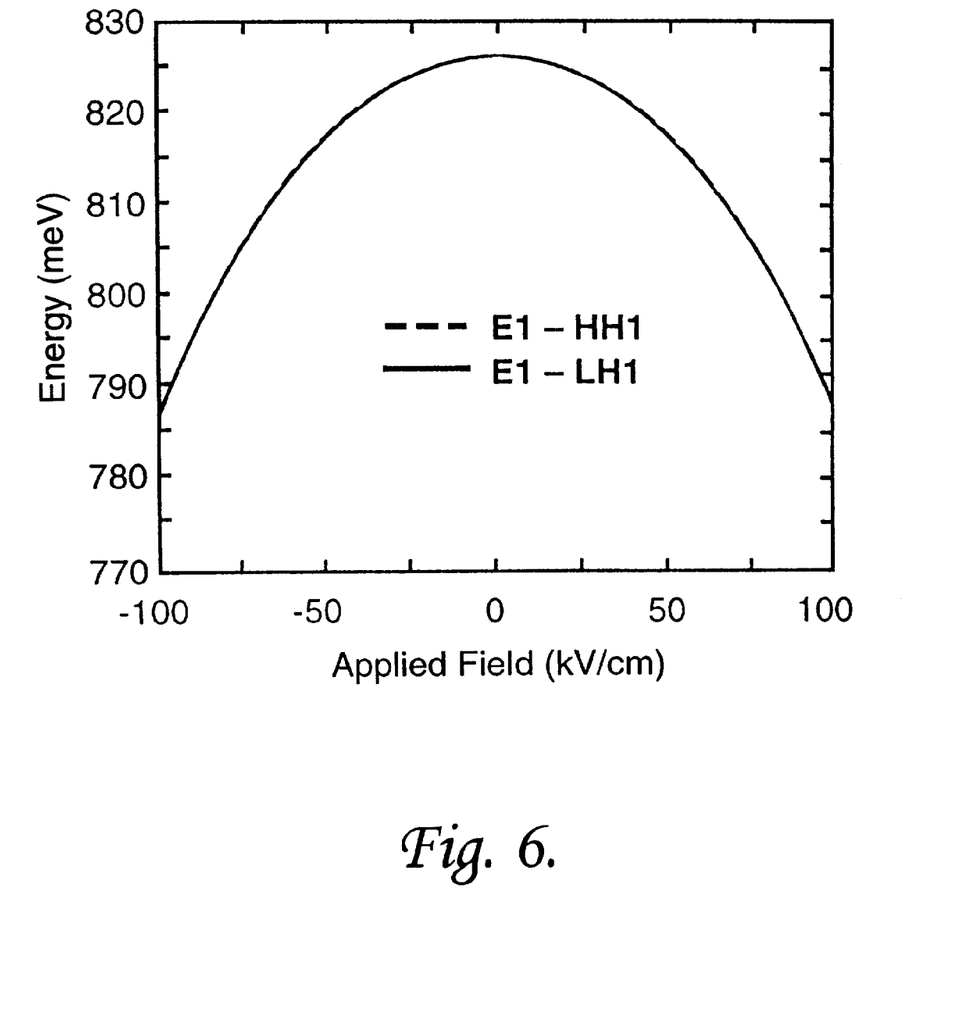
FIG. 6 is a plot of the Stark effect shifts for heavy-holes and light-holes in respect of a modulator with a quantum well 3-layer substructure providing the band diagram of FIG. 5.

The calculated quantum-confined Stark effect energy shifts of the E1-HH1 and E1-LH1 transitions for the structure with applied fields up to ±100 kV/cm are shown in FIG. 6. As with the single composition (substructureless) quantum well to which FIG. 3 refers, the two state are degenerate at zero field, but unlike the single composition well they remain matched over the entire field range up to 100 kV/cm. In qualitative terms this behaviour can be understood by looking at the infinite well case. The Stark shift with small applied electric fields in an infinite well is proportional to $m^*L^4$, where $m^*$ is the effective mass and L is the well width. Heavy-hole states will therefore shift more rapidly with applied field than the light-hole states. However, the larger Stark shift of the HH1 state compared to the LH1 state is offset by confining the heavy-hole wavefunction to a narrower well width than the light-hole wavefunction the HH1 state being confined substantially to the central 40 Å region of substructure layer 12d, and the LH1 state substantially to the entire 120Å of the whole quantum well comprising substructure layer 12d together with the two substructure layers 12c. Taking into account the finite well depth, the unequal confinement of the heavy-hole and light-hole wavefunctions compensates for their different effective masses and results in the Stark shifts becoming identical.

Figure 7:
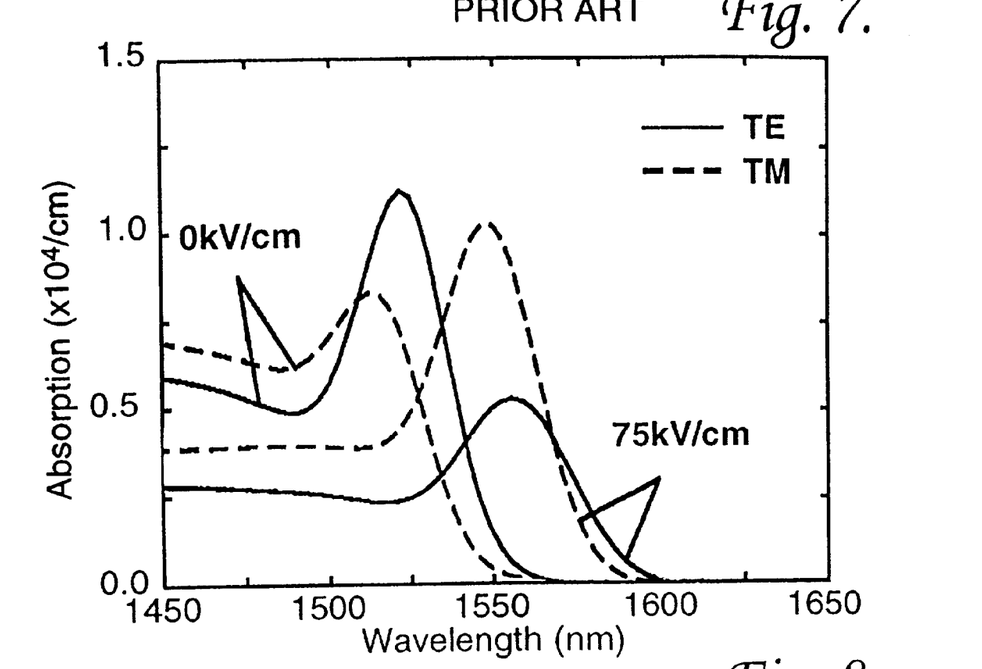
FIG. 7 depicts the calculated TE and TM absorption spectra at two values of applied field in respect of a modulator whose quantum wells possess no substructure.
Figure 8:
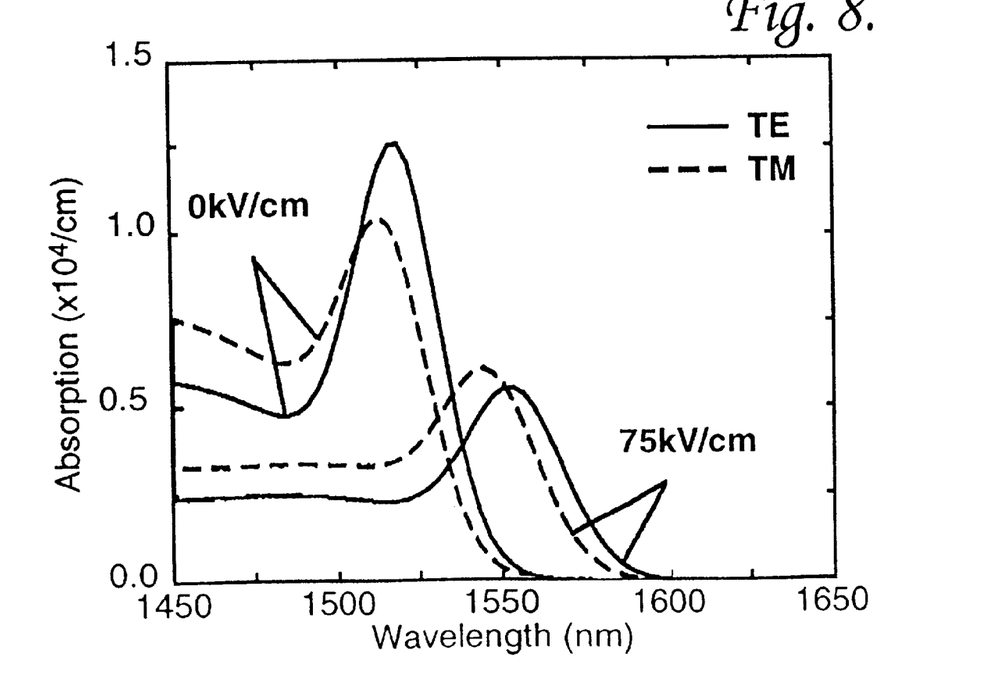
FIG. 8 depicts the corresponding absorption spectra in respect of a modulator with the quantum well substructure of FIG. 5.

The structure of FIG. 5 has been constructed in order to provide as close as possible a match between the Stark shifts of the E1-HH1 and E1-LH1 transitions, and from the general analysis given above it might be thought that this will provide optimised equalisation of TE and TM modes absorption. However that analysis has not taken account of the perturbing effect upon the absorption characteristics presented by the fact that the E1-HH1 and E1-LH1 excitons have slightly different binding energies. The effect of this difference in binding energies is clearly to be seen in FIG. 8. FIG. 7 shows the TE and TM absorption spectra calculated at two values of applied field for a quantum well modulator as depicted in FIG. 5 except that its 120 Å thick quantum well layer, instead of having a substructure comprising three 40 Å thick substructure layer, is constituted by a single 120 Å thick layer of uniform composition chosen to provide a lattice constant placing the quantum well layer in 0.32% tensile strain. (The value of the strain is chosen in relation to the quantum well thickness in order to provide the E1-HH1 and E1-LH1 transitions with equal energies under conditions of zero applied field.) One value of applied field is zero (0kV/cm) and the other value (65kV/cm) is the field required to provide exciton peaks for the TE and TM modes at wavelengths in the region of 1.55 μm. At zero applied field the wavelengths two exciton peaks do not precisely coincide because of the difference between the exciton binding energies of the E1-HH1 and E1-LH1 excitons. There is also a wavelength difference between the exciton peaks at an applied field 65 kV/cm. It is also noteworthy that the application of the field is seen to have the effect of enhancing the TM exciton absorption while diminishing the TE exciton absorption, thereby making the absorption presented by the quantum well in the presence of the applied field significantly polarisation dependent. FIG. 8 is the equivalent figure in respect of the quantum well with the 3-layer substructure of FIG. 5. In this instance a slightly larger applied field, 75 kV/cm instead of 65 kV/cm, is required to provide exciton peaks for the TE and TM modes at wavelengths in the region of 1.55 μm. In this instance the application of the field is seen to have the effect of diminishing to approximately equal values TM and TE exciton absorption peaks. There is still evident the slight wavelength displacement between the two peaks caused by the difference in exciton binding energies, but it will be apparent that this displacement can be eliminated by making slight adjustments to the well substructure layer thicknesses and/or strains so as to compensate for this effect of the exciton binding energies difference.

What is claimed is:

1. A quantum confined Stark effect modulator in which the or each quantum well layer of the modulator has a non-uniform composition that provides, across the thickness of the layer, a non-uniform value of lattice constant to produce a strain profile in the modulator that provides the modulator with substantially matching E1-HH1 and E1-LH1 Stark shifts for at least one polarity of applied electric field from 0 up to 100 kV/cm and zero field E1-LH1 and E1-HH1 transitions that are substantilly degenerate.

2. A modulator as claimed in claim 1, wherein the or each quantum well layer has a substructure of at least two substructure layers of different lattice constant providing, in the direction normal to the layers, hole wavefunctions for heavy-holes, HH1, and for light-holes, LH1, that are skewed with respect to the mid-plane of the quantum well layer, and wherein the relative compositions of the substructure layers are chosen in relation to their relative thicknesses to provide differential strains such that the resulting skew in one direction for heavy-holes is compensated by the skew in the opposite direction for light-holes in a manner providing substantial matching of the Stark shifts of the E1-HH1 and E1-LH1 transitions for an applied field of one particular polarity from 0 up to 100 kV/cm.

3. A modulator as claimed in claim 1, wherein the or each quantum well layer has a substructure consisting of two substructure layers.

4. A modulator as claimed in claim 3, wherein the two substructure layers are of equal thickness.

5. A modulator as claimed in claim 1, wherein the or each quantum well layer has a substructure of at least three substructure layers not all of the same lattice constant which quantum well layer is symmetric about its mid-plane.

6. A modulator as claimed in claim 5, wherein the or each quantum well layer is comprised of three substructure layers.

7. A modulator as claimed in claim 6, wherein the substructure layers are of equal thickness.

* * * * *